[19] United States Patent
White et al.

[11] Patent Number: 4,581,238
[45] Date of Patent: Apr. 8, 1986

[54] METHOD OF CONDITIONING EDIBLE SEEDS

[75] Inventors: Thomas C. White, O'Fallon; Robert A. Swick, Creve Coeur, both of Mo.

[73] Assignee: Monsanto Company, St. Louis, Mo.

[21] Appl. No.: 567,712

[22] Filed: Jan. 3, 1984

[51] Int. Cl.$^4$ ................................................. A23B 9/00
[52] U.S. Cl. .................................... 426/331; 426/335; 426/618; 426/629; 426/507; 426/511
[58] Field of Search ............... 426/321, 331, 335, 310, 426/618, 629, 461, 455, 462, 511, 507

[56] References Cited

U.S. PATENT DOCUMENTS

| Re. 10,978 | 1/1889 | Cormack | 426/461 |
|---|---|---|---|
| 341,355 | 5/1886 | Solter et al. | 426/461 |
| 353,924 | 12/1886 | Cormack | 426/461 |
| 1,522,531 | 1/1925 | Meyers | 426/461 |
| 2,948,585 | 8/1960 | Fitzgibbon | 426/335 |
| 3,173,794 | 3/1965 | Reckon | 426/462 |
| 3,342,607 | 9/1967 | Hickey | 426/462 |
| 4,042,716 | 8/1977 | Bertram et al. | 426/335 |
| 4,208,443 | 6/1980 | Kanuch et al. | 426/310 |

FOREIGN PATENT DOCUMENTS 2206057 12/1974 France ................................ 426/335

Primary Examiner—Robert Yoncoskie
Assistant Examiner—Marianne M. Cintins
Attorney, Agent, or Firm—Thomas E. Kelley; George R. Beck; W. H. Duffey

[57] ABSTRACT

A method for conditioning edible seeds (cereal grains, pulses, etc.) prior to rolling is disclosed wherein a sorbate is dispersed in steam with which the seeds are contacted. The conditioned grain has increased shelf life (improved resistance to growth of microorganisms) and is also less prone to production of fines.

10 Claims, 2 Drawing Figures

METHOD OF CONDITIONING EDIBLE SEEDS

BACKGROUND OF THE INVENTION

This invention relates to conditioning of seeds including cereal grains, pulses (peas, beans, lentils and other leguminous crops) and other edible seeds such as sunflower or safflower seeds, rapeseeds, etc. In particular, the invention relates to conditioning of such seeds prior to rolling, i.e., passing the seeds through rollers to flatten them, usually to make them more digestible and/or palatable. As used herein, the term "rolling" includes the conventional variations thereof, e.g. flaking or crimping of the seeds.

In foods or animal feeds containing such seeds, microorganisms can cause heating, caking or dusting, and also impart unpleasant odors or flavors. Further, the presence of certain microbial species can lead to the formation of toxic metabolites known as mycotoxins, including aflatoxins, ochratoxins, rubratoxins, citrinin and others.

Generally, it is necessary that edible seeds be conditioned prior to rolling by increasing their moisture level, preferably softening the seeds so that proper rolling, flaking and/or crimping will occur rather than crushing or powdering. For this purpose, steam conditioning is often utilized, the seeds being exposed to steam within a conditioning chamber through which the seeds flow prior to rolling. After rolling, the seeds are normally dried and cooled but retain a finite moisture level and are thus vulnerable to growth of microorganisms such as molds, yeasts, and/or bacteria.

To inhibit the growth of microorganisms, it has been known to treat edible seeds, e.g., by a spray application following rolling, with various feed preservatives including potassium sorbate, sorbic acid, propionic acid and calcium propionate. Sorbic acid and the sorbates are highly efficacious for this purpose.

When subjected to rolling, such edible seeds are prone to the formation of fines resulting from comminution of seed structures. As such structures break and separate under mechanical stress, the fines tend to accumulate in processing and handling facilities or are otherwise lost. Thus, for example, grain dust accumulates in and around grain handling equipment including conveyors, augers, etc. Such dust constitutes a safety hazard, being combustible and even explosive.

When feeds containing such fines are fed to animals, they may cause respiratory problems, especially in horses which are commonly fed flaked grain. In cattle parlors, fines objectionably accumulate in feeding containers.

To the feed grain producer, such fines constitute an economic loss. In small scale operations, fines are irretrievably lost. Other processors may blend fines into lesser quality feeds, e.g., in pelleting operations, to partially reduce such losses. In any event, it is typical for fines to constitute for the producer a loss of 5 percent or more of the processed grain or other edible seeds.

SUMMARY OF THE INVENTION

Edible seeds are conditioned in accordance with a broad aspect of the invention not only to inhibit degradation and spoilage from the growth of microorganisms, but also to substantially decrease the production of the fines during rolling of the seeds. Such conditioning involves intimately contacting the seeds with steam having a sorbate dispersed therein.

In a preferred embodiment, an aqueous solution of the sorbate is dispersed in steam to provide a mixture which can be injected into a conditioning chamber containing a bulk quantity of the edible seeds and from which the seeds may be fed to a rolling operation, whereby the seeds therein are exposed to that mixture for a conditioning interval of controllable length, such interval being normally approximately the residence period of the seeds within that chamber.

One object achieved by the invention is a method resulting in substantial (usually at least about 20% and typically even greater) reduction of fines, reduced breakage of the rolled seeds, better appearance and structure of the seeds after rolling, and substantial protection of the seeds against the effects of microorganisms resulting in the seeds being capable of longer storage without intolerable microbial spoilage.

Other objects achieved by the invention are improvements in the general character of the seeds after such conditioning, e.g., so as to be generally more amenable to rolling and/or other processing. Another such object is a method of conditioning which promotes the uniform, thorough exposure of the seeds to the sorbates and their preservative effects, but which does not require a separate step for treatment of the seeds with preservatives, thereby permitting conventional rolling and further handling to be carried out without interruption or batching.

Other objects achieved by the invention include a method which avoids the need for installation and maintenance of mechanical grain preservative pumps, spray stations and preservative treatment facilities; which utilizes existing seed processing facilities; which can be implemented by relatively unskilled labor; which does not require installation of additional power sources; which requires only simple apparatus; which does not involve the use of toxic or corrosive substances; and which is highly cost-effective for the user. Additional objects will be apparent from the detailed description and claims herein.

DETAILED DESCRIPTION OF THE INVENTION

As used herein, the term "edible seeds" is used to refer to one or more cereal grains such as, for example, corn, oats, barley, and milo (grain sorghum); pulses, i.e., the edible seeds of leguminous crops such as for example, peas, beans (e.g., soybeans), or lentils; and oil seeds or any other seeds, e.g., sunflower, safflower or rapeseeds, which are edible by humans or animals. Varieties of seeds to which the invention is applicable are set forth in *Principles Of Field Crop Production* by J. H. Martin et al, McMillan Publishing Co. (3rd Ed. 1976), the disclosure of which is incorporated by reference, and particularly pages 15–16 thereof.

Such seeds are commonly rolled to a flatter form suitable for further processing, e.g., mixing with other grains and/or molasses to provide animal feeds. While primarily useful in the production of such animal feeds, the present invention is also useful in the processing of cereal grains, pulses or other edible seeds for human consumption.

In the method of this invention, the seeds are intimately contacted with the sorbate-containing steam in a conditioner which, according to known practice, may be a large, vertically elongated bin to which the steam may be introduced at various levels. In such a conditioner, the seeds may be continuously fed to the top thereof and continuously withdrawn from the bottom for rolling or the like. Depending on the relative flows of the seeds and steam, the steam may or may not rise countercurrently against the downwardly-flowing seeds.

In such a conditioner, the seeds are generally moisturized so that their relative moistness may increase from a typical incoming level of about 12–16 percent, normally by an additional 2–6 percent, approximately, and are usually heated during exposure to the steam to a temperature between about 65° and about 100°, preferably at least about 75° and usually not more than about 95°.

After emerging from conventional rolling, the rolled seeds are usually fed to a conventional cooler for cooling and drying by partial removal of the moisture, generally back to a level of about 12–16 percent, after which they can be passed to blending, shipping or storage.

Figure 1:
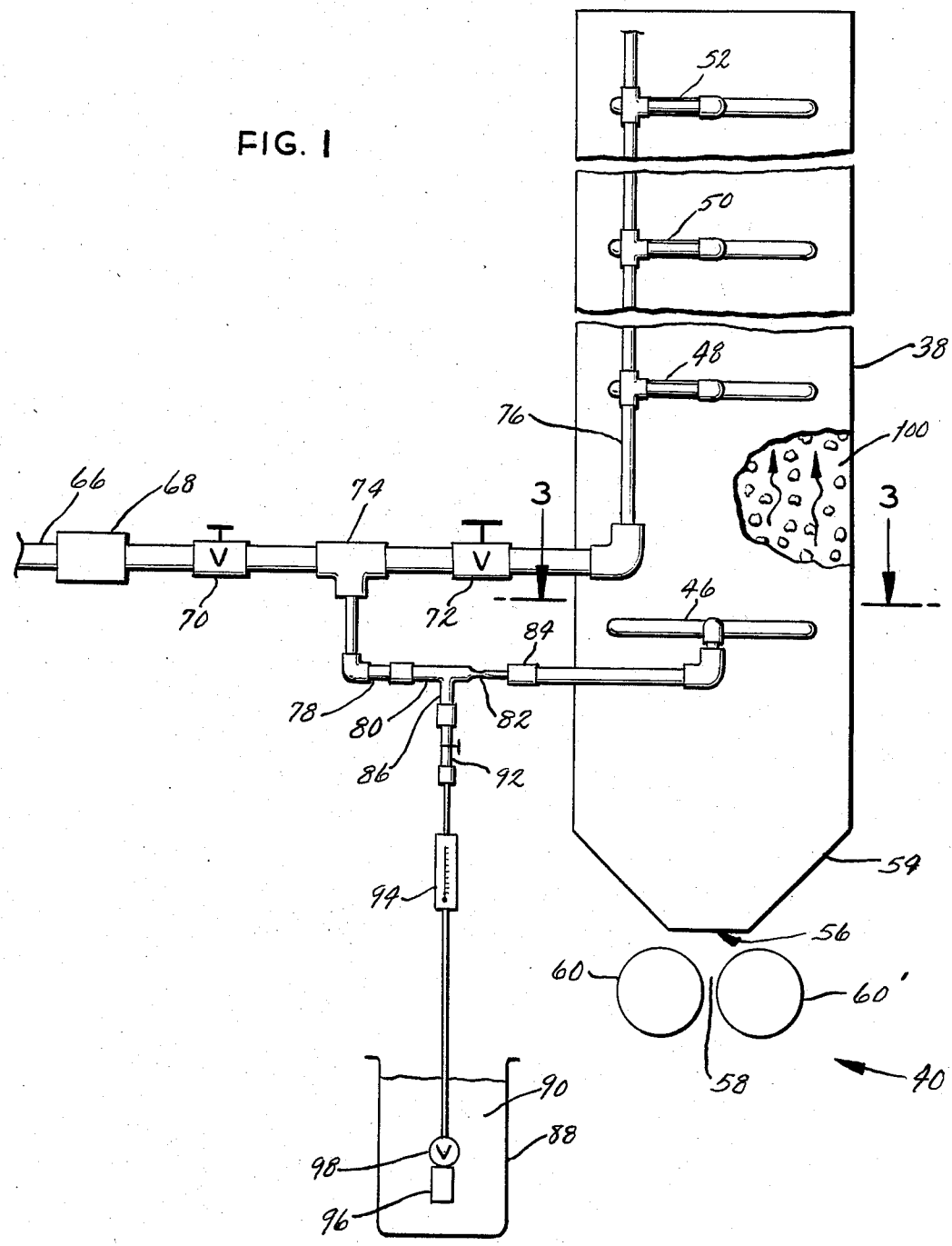
FIG. 1 is a simplified schematic diagram illustrating a typical arrangement for implementing the seed conditioning method of this invention.

Referring to FIG. 1, the following description relates to a typical arrangement for implementing the conditioning method of this invention:

Conditioner 38 is shown in the form of a vertically elongated chamber of rectangular cross-section, such chamber being typically from about 1.5 to about 7 meters in length. A plurality of steam inlet manifolds, as at 46, 48, 50 and 52, are conventionally provided for introducing steam into conditioner 38 at various elevations, with manifold 48 being proximate the lower end 54 of the conditioner from which the seeds are discharged from a chute or opening 56 into the space 58 between rolls 60, 60' of a conventional grain roller generally designated 40.

Each of manifolds 46, 48, 50, and 52 can provide steam to steam inlet tubes. The arrangement is exemplified in FIG. 2 wherein steam inlet tubes 62, each extending across the width of conditioner 38, are shown having apertures 64 along their lengths for uniform introduction of steam to the contents of the conditioner.

Steam at a pressure generally between about 2.8 and 7 kg/cm$^2$, and often preferably between about 3.2 and 5.6 kg/cm$^2$, is supplied by a steam line 66 through a pressure regulator 68 controlled by a main valve 70. A balancing valve 72 on the downstream side of a tee 74 controls the entry of steam into a riser conduit 76 communicating with each of manifolds 48, 50 and 52.

Riser 76 may be a steam line conventionally supplying steam (as in prior art conditioners) to a lower manifold corresponding to that designated 46; but, in accordance with a preferred embodiment of this invention, manifold 46 is utilized for injecting the sorbate-containing steam into the lower end of conditioner 38, with sorbate-free steam being introduced through manifolds 48, 50 and 52.

For this purpose, a portion of the steam flow is diverted via tee 74 into a line 78 in which there is situated a siphon jet pump 80, being termed herein a "jet pump" of the known type (venturi principle) having inlet section 82 communicating with an outlet 84 and operating in response to the flow of steam through line 78. In desired operation, this causes fluid to be drawn into a siphon or suction intake section 86, which is interconnected with a source of sorbates such as, most preferably, a container 88 of potassium sorbate in an aqueous solution 90. The suction intake 86 is connected to a sorbate control valve 92 which receives the sorbate through a flowmeter 94. A filter 96 is located within the sorbate solution 90, and the lower end of the suction line may be fitted with a foot (or check) valve 98 if desired.

In operation, balancing valve 72 is adjusted to establish a preset ratio, or division, of steam flow between lines 76 and 78, while valve 92 is adjusted to cause a predetermined amount of the sorbate solution to be dispersed in the steam flowing through jet pump 80 to achieve a predetermined sorbate concentration in the conditioned seeds.

In accordance with the invention, the time interval of conditioning (exposure of seeds to the sorbate-containing steam) is usually at least about 5 minutes and often preferably at least about 10 minutes or longer, although any interval can be employed if it achieves the desired effects. With grains such as shelled corn, it is generally desirable to increase the moisture content of the seeds to not greater than about 16 percent, but with a conditioning interval more typically between about 10 (preferably at least about 15) and about 20 minutes.

The sorbate to be dispersed in steam for introduction into conditioner 38 can be any sorbate selected from the group consisting of alkali metal sorbates, e.g., sodium sorbate or most preferably potassium sorbate ($CH_3CH=CHCH=CHCOOK$); alkaline earth metal sorbates, e.g., calcium sorbate; and sorbic acid (2,4-hexadienoic acid; $CH_3CH=CHCH=CHCOOH$).

The sorbate can be dispersed in steam prior to contacting the seeds by various techniques known in the art, e.g., a siphon jet pump as mentioned before. Although otherwise feasible, it is usually advantageous to first dissolve the sorbate in a liquid medium. For sorbates having good water solubility, the medium is desirably water. For example, potassium sorbate, which is most preferred for use in this invention, is advantageously dissolved to make an aqueous solution containing about 30 percent sorbate prior to dispersion in the steam. In the case of sorbic acid, its solubility in water being only slight, it may be preferably dissolved in other liquids, e.g. ethanol, propylene glycol, alkalies, or organic acids. However, any of the sorbates can be dissolved in aqueous media up to its solubility limit for dispersion in the steam. Using sorbic acid, that limit is on the order of only a few percent, while the solubility limit of sodium sorbate in water is on the order of 28 percent. Other adjuvants or additives may also be included in such media for concurrent dispersion in the steam.

Regardless of the sorbate employed, it is preferred to impart to the conditioned seeds a sorbate level of at least about 200 ppm for substantial protection of the seeds against spoilage from the growth of microorganisms while also attaining the aforementioned reduction of fines during subsequent rolling. There is no known upper limit to the sorbate level in terms of effectiveness for this invention but for practical, cost-effective applications, that level will generally be no greater than about 2,000 ppm. Usually, the sorbate level is preferably at least about 250 ppm and even more preferably at least about 500 ppm. In most instances, that sorbate level need not be higher than about 1,000 ppm. Throughout this specification and the appended claims, such sorbate levels are expressed in ppm calculated as the potassium sorbate equivalent of whatever sorbate is present on the conditioned seeds.

This invention provides an aid to rolling of the seeds, in that such rolling is facilitated and an improved rolled product results, its structure being noticeably more intact, resilient and physically secure, with fewer ragged edges apparent. When the seeds, after conditioning and rolling in accordance with the invention, are observed in a small glass container and compared with otherwise identical seeds which have been similarly rolled but treated instead with steam containing no sorbate, the less brittle, less ragged, more pliable, stronger character of the seeds treated in accordance with the invention is clearly apparent. When such containers are shaken vigorously, the seeds conditioned according to the invention are far less prone to production of fines, dust, particle chips and fragments, both large and small. Such fines, which are readily produced in the untreated seed container, collect on its bottom, and the sides of the container appear dusty.

Conditioning of the seeds (especially corn and other grains) by this invention also results in a desirable softening of the seeds, which not only facilitates rolling but is also believed to result in the improved subsequent structure of the rolled seeds. It is further believed that applying the sorbate to the seeds concurrently with heating the seeds with steam provides an enhanced preservative effectiveness of the sorbate. In other words, concurrently contacting the seeds with steam and the sorbate is believed to result in a synergistically enhanced activity of the sorbate against the growth of microorganisms on the seeds. This may result from the apparently more uniform application of the sorbate to the seeds which is achieved by application of the sorbate while dispersed in the steam.

This invention may be also useful in treatment of pelleted grains or other animal feeds. In a pelleting operation, ground seeds and optionally other nutrient sources are typically combined with a premix containing vitamins, minerals and possibly other ingredients such as binders and/or lubricants. The blend is extruded through a pelleting die in a process utilizing steam in which a sorbate may be dispersed for use in accordance with this invention to provide, in the pelleted product, the sorbate levels described herein.

The following Examples are presented to illustrate the invention and do not imply any limitation on its scope. Throughout this specification, percentages are by weight and temperatures are in centigrade except where otherwise noted.

EXAMPLES 1–6

Figure 2:
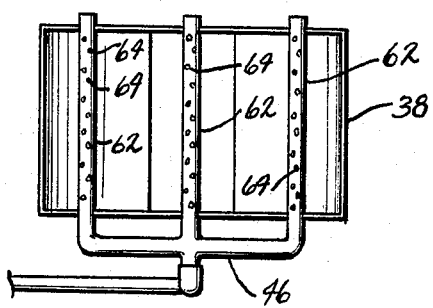
FIG. 2 is a simplified, fragmentary horizontal cross-section taken generally along line 3—3 of FIG. 1.

Shelled corn is conditioned before rolling by use of a conditioning chamber into which there is supplied, in equipment as shown in FIG. 2, steam at a pressure of 5.6 kg/cm² and, through manifold 46, similar steam in which there has been dispersed a 30% solution of potassium sorbate (AFLABAN* KSG feed preservative) in water. A grain feed rate of 76 kg/min is used resulting in a grain retention time in the conditioner (6 meters in height) of 15–20 minutes. Production of fines is observed by qualitative assessments of dust and other fines accumulated below the processing equipment after 3.2 hours of conventional rolling of the corn. High performance liquid chromatography is used to measure the average resultant sorbate level in the rolled product. Conventional shelf life evaluations are conducted by daily inspecting samples of the rolled grain maintained at 83% RH and 28° and expressed as the number of days which have elapsed when 80% of the samples have visual mold. Results are in Table I together with the results of Comparative Example A in which no sorbate or other preservative is included in the steam but a relatively low level of sorbate is present on the rolled corn due to a residue of sorbate in the conditioner from a prior run.

* Registered trademark of Monsanto Company.

EXAMPLES 7–10

Shelled corn is conditioned prior to conventional rolling as in Examples 1–6 except that the conditioning chamber is 1.5 meters in height, the steam pressure is 3.37 kg/cm², and the grain is fed at 30 kg/min, resulting in a retention time in the conditioner of 10 minutes. Results are in Table I together with those of Comparative Example B carried out using steam containing no sorbate or other preservative.

EXAMPLE 11

When oats are conditioned prior to conventional rolling essentially according to the procedure of Examples 7–10 except that the sorbate level on the rolled grain is 200 ppm, results are generally the same as those shown in Table I. In addition, there are very few fines and a flatter, more intact kernel is clearly evident.

TABLE I

| Example | Avg. Final H₂O Content, % | Avg. Sorbate Level, ppm | Shelf Life Days | Shelf Life Increase, % | Fines, % Of Total Weight |
|---|---|---|---|---|---|
| A | 14.3 | 139 | 26 | — | 5% |
| 1 | 13.3 | 353 | 41 | 58 | <1% |
| 2 | 13.0 | 243 | 37 | 42 | <1% |
| 3 | 13.2 | 436 | 31 | 19 | <1% |
| 4 | 12.9 | 538 | 34 | 31 | <1% |
| 5 | 12.3 | 490 | 33 | 27 | <1% |
| 6 | 14.8 | 862 | >47 | 81 | <1% |
| B | 16.3 | — | 13 | — | 5–8 |
| 7 | 15.6 | 928 | 22 | 69 | 2.5–4 (Est.) |
| 8 | 16.0 | 1,567 | 22 | 69 | 2.5–4 (Est.) |
| 9 | 15.1 | 1,849 | 27+ | 108 | 2.5–4 (Est.) |
| 10 | 15.8 | 2,815 | >30 | >130 | 2.5–4 (Est.) |

We claim:

1. A method of providing rolled seeds comprising:
   (a) intimately contacting edible seeds with steam having a sorbate dispersed therein in an amount sufficient to impart to said seeds an average sorbate level of at least about 200 ppm, expressed as potassium sorbate, said sorbate being selected from the group consisting of alkaline metal sorbates, alkaline earth metal sorbates, sorbic acid and mixtures thereof;
   (b) rolling said edible seeds to provide rolled seeds; wherein the production of fines is substantially decreased and wherein said rolled seeds are conditioned to inhibit degradation and spoilage thereof from the effects of microorganisms.

2. A method of claim 1 wherein said seeds are predominantly cereal grain.

3. A method of claim 2 wherein said rolling comprises flaking or crimping said grain.

4. A method of claim 3 wherein said grain is corn.

5. A method of claim 4 wherein the moisture level of said corn is increased during said contacting to not greater than about 16 percent.

6. A method of claim 1 wherein said level is between about 500 and about 1,000 ppm, expressed as potassium sorbate.

7. A method of claim 1 wherein the sorbate in said steam is potassium sorbate.

8. A method of claim 1 wherein the steam is applied at a pressure between about 2.8 and 7 kg/cm$^2$.

9. A method of claim 1 wherein the seeds are heated during said contacting to a temperature between abut 65° and about 100° C.

10. A method of claim 1 wherein said contacting is continued for at least about 5 minutes.

* * * * *